W. A. HENDERSON.
AUTOMOBILE TRANSMISSION.
APPLICATION FILED DEC. 27, 1912.

1,136,526.

Patented Apr. 20, 1915.

Witnesses
Ernest Crocker
V. B. Hillyard.

Inventor
W. A. Henderson
By Victor J. Evans
Attorney

UNITED STATES PATENT OFFICE.

WREX A. HENDERSON, OF RANDSBURG, CALIFORNIA.

AUTOMOBILE TRANSMISSION.

1,136,526.

Specification of Letters Patent. Patented Apr. 20, 1915.

Application filed December 27, 1912. Serial No. 738,869.

*To all whom it may concern:*

Be it known that I, WREX A. HENDERSON, a citizen of the United States, residing at Randsburg, in the county of Kern and State of California, have invented new and useful Improvements in Automobile Transmission, of which the following is a specification.

This invention has relation to gearing and most especially to such gearing for transmitting a variable speed from a motor to the part to be driven chiefly for mechanically propelled vehicles of which the automobile is typical.

The invention provides a changeable speed gear which precludes the stripping of the teeth of the gear elements and which embodies a minimum number of parts, the arrangement being such as to preclude the possibility of throwing any two of the speed gears into action at the same time and in which the several gears are thrown into and out of operation in successive order so that it is practically impossible to pass from high speed to low or vice versa without going through the intermediate stage or gear.

The invention consists of the novel features, details of construction and combination of parts, which hereinafter will be more particularly set forth, illustrated in the accompanying drawing, and pointed out in the appended claim.

Figure 1:
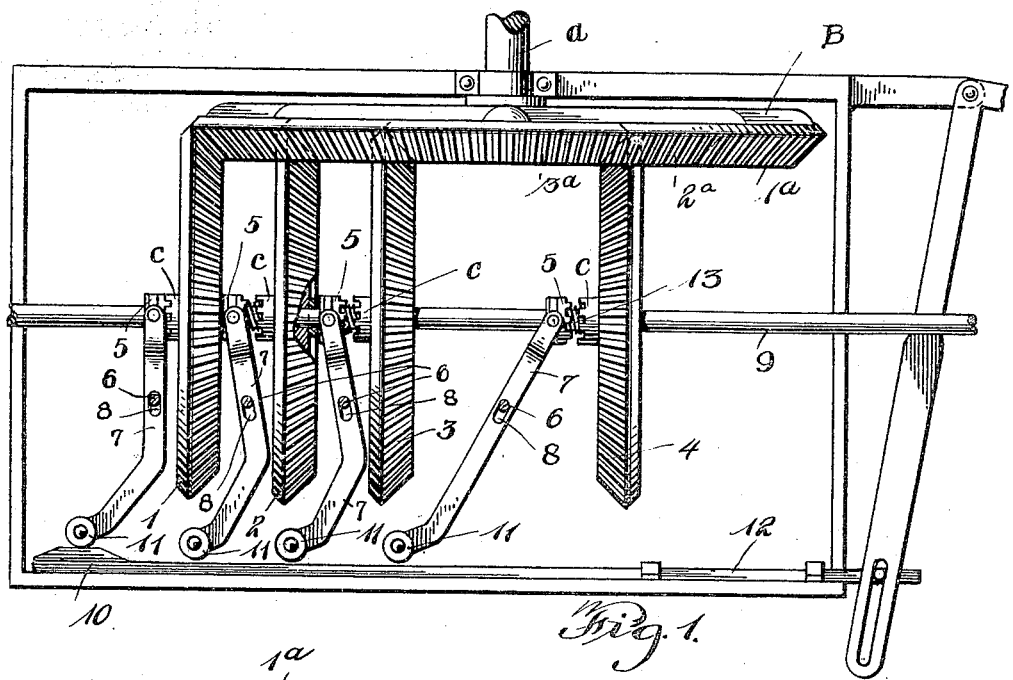
Figure 2:
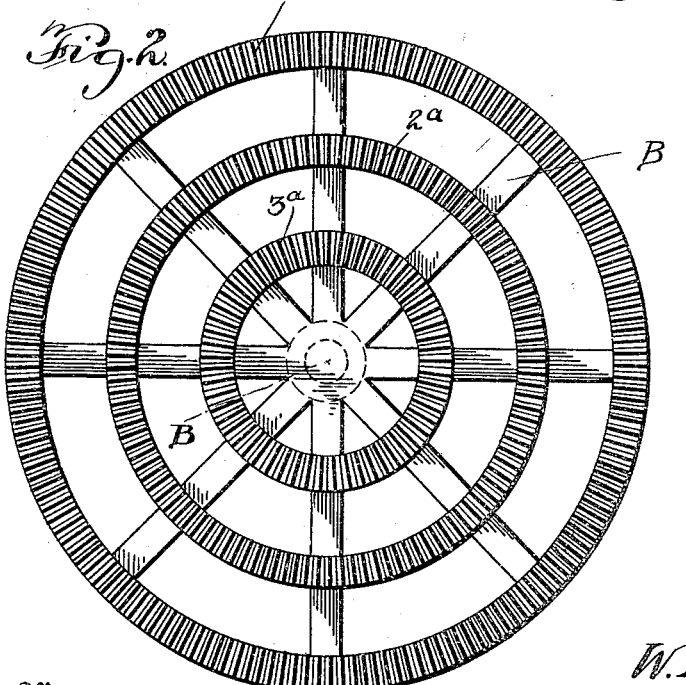
Figure 3:
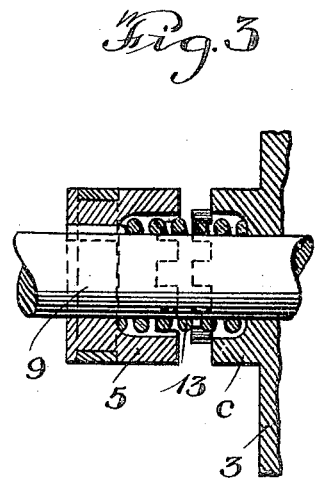

Referring to the drawing, forming a part of the specification, Figure 1 is a plan view of a transmission gearing embodying the invention. Fig. 2 is a face view of the multiple gear. Fig. 3 is a detail view.

Corresponding and like parts are referred to in the following description, and indicated in all the views of the drawing, by the same reference characters.

The power driven shaft is designated by the reference letter $a$ and may be operated by a motor of any type. A multiple gear B is secured to the power driven shaft $a$. A counter shaft 9 is adapted to be connected with the part to be driven, such as the axle of an automobile or other mechanically propelled machine. A plurality of gears 1, 2, 3 and 4 are mounted upon the shaft 9 and are loose thereon and are in mesh with the respective toothed elements $1^a$, $2^a$ and $3^a$ of the multiple gear B. The gears 1, 2 and 3 are for forward speed, whereas the gear 4 is the reverse. The toothed parts of the multiple gear B are in the same plane, but are of different diameters. The gear wheels 1, 2, 3 and 4 are of like diameter and are so positioned as to remain in mesh at all times with the toothed portions of the multiple gear, thereby preventing the stripping of the teeth so common in transmission of the type embodying shifting gears. The toothed parts of the several meshing gear elements are of the bevel or miter type. Each of the gears 1, 2, 3 and 4 has a half clutch $c$ upon one face which is adapted to coöperate with a clutch sleeve 5 movable upon the shaft 9 and splined or otherwise secured thereon to rotate therewith. Each clutch sleeve 5 has a lever 7 arranged to coöperate therewith, said lever having an elongated opening 8 through which passes a rod 6. The free end of each lever 7 has a roller 11 which is arranged in the path of an actuator 10, which is mounted to travel in a guide and is attached to a rod or bar 12. The actuator 10 consists of a block having its opposite ends beveled or inclined so as to ride under the free ends of the lever 7 to move them and the clutch sleeves attached thereto. The rod or bar 12 may be connected to a lever or other operating means conveniently positioned to be actuated by the driver of the machine or other operator. A spring 13 exerts a pressure upon each of the levers 7 to normally hold the clutch sleeve clear of the pinion clutch element with which it coöperates. Upon moving the rod or bar 12 the actuator 10 is successively brought into engagement with the several levers 7, thereby moving such levers and the clutch sleeves attached to or coöperating therewith. This action throws the gear wheels into clutched engagement with the shaft 9 in successive order, whereby the speed is increased or decreased by stages. The gear wheels 1, 2 and 3 represent speeds forward and the gear wheel 4 the reverse.

It will be understood from the foregoing, reference being had to the accompanying drawing, that the invention provides a transmission for mechanically driven vehicles which will prevent the stripping of the gears because the teeth of the several gears are at all times in mesh.

It is further noted that the invention results in a simple construction and in the provision of a minimum number of parts, the arrangement being such that the speed is increased or decreased by stages so that it is practically impossible to pass from low to high or vice versa. By having the gear wheels 1, 2, 3 and 4 of like diameter it is possible to interchange one for the other, thereby equalizing the wear.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

A transmission gearing comprising a multiple gear having concentric toothed portions upon one of its sides in substantially the same plane, a shaft arranged parallel and in line with the axis of the multiple gear, a plurality of gear wheels of like diameter mounted loosely upon the shaft and in mesh with the respective toothed portions of the multiple gear, each of such gear wheels being provided upon one side with a clutch member, complemental clutch members, one for each of the gear wheels, splined upon the shaft and adapted to engage with the respective clutch members of the gear wheels, a plurality of levers arranged between the gear wheels and mounted between their ends, one end of each of the levers engaging a clutch member, and a longitudinally movable actuator having a projecting part to successively engage with the clutch operating levers to throw the clutches into operative relation.

In testimony whereof I affix my signature in presence of two witnesses.

WREX A. HENDERSON.

Witnesses:
S. W. LOONEY,
CHAS. R. BADGER.

Copies of this patent may be obtained for five cents each, by addressing the "Commissioner of Patents, Washington, D. C."